Jan. 18, 1966  F. RIEDL  3,229,549
INFINITELY VARIABLE GEAR, PREFERABLY FOR MOTOR VEHICLES
Filed March 26, 1962  3 Sheets-Sheet 1

INVENTOR
FRANZ RIEDL
BY Dicke and Craig
ATTORNEYS

Jan. 18, 1966    F. RIEDL    3,229,549
INFINITELY VARIABLE GEAR, PREFERABLY FOR MOTOR VEHICLES
Filed March 26, 1962    3 Sheets-Sheet 2
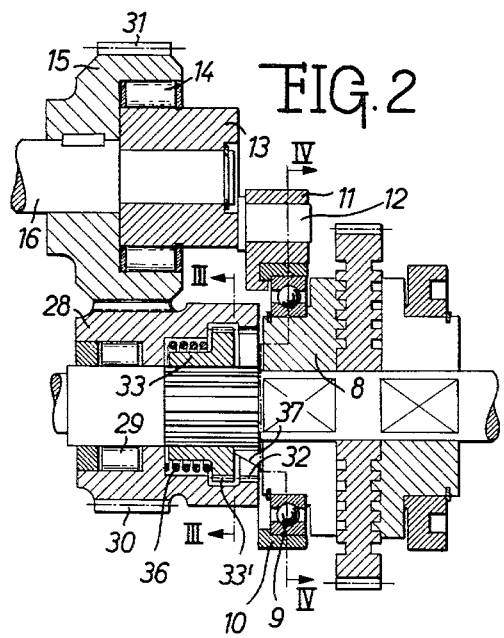
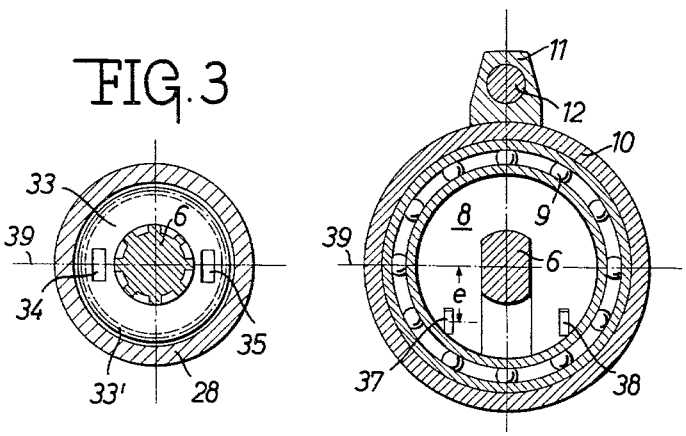
INVENTOR
FRANZ RIEDL
BY Dicke and Craig
ATTORNEYS Jan. 18, 1966  F. RIEDL  3,229,549
INFINITELY VARIABLE GEAR, PREFERABLY FOR MOTOR VEHICLES
Filed March 26, 1962  3 Sheets-Sheet 3

INVENTOR.
FRANZ RIEDL
BY Dicke & Craig
ATTORNEYS.

United States Patent Office 3,229,549
Patented Jan. 18, 1966

3,229,549
INFINITELY VARIABLE GEAR, PREFERABLY
FOR MOTOR VEHICLES
Franz Riedl, Haupstrasse 78, Sinningen, Kreis Biberach,
Wurttemberg, Germany
Filed Mar. 26, 1962, Ser. No. 182,246
Claims priority, application Germany, Mar. 29, 1961,
R 29,996; Apr. 24, 1961, R 30,158
3 Claims. (Cl. 74—640)

The present invention relates to infinitely variable gears, preferably for motor vehicles.

In gears of this type it is known to provide between the drive shaft and the driven shaft overrunning clutches, the inner or outer main members of which are positively connected by means of gear wheels to the driven shaft, while the outer or inner main members thereof carry arms of a cranklike shape, the ends of which engage with a member which is adjustable eccentrically relative to the drive shaft. In such infinitely variable gears it is further known to connect the drive shaft or elements which are positively connected thereto by means of a central overrunning clutch by connecting the drive shaft to the inner or outer main member of this clutch so to be nonrotatable relative to each other or by integrally securing the drive shaft to a main member of this clutch, while the outer or inner main member of the overrunning clutch is nonrotatably connected to the driven shaft. The grip rollers of the clutch are then arranged in such a manner that the clutch connects both shafts directly when the driven shaft rotates at a speed higher than that of the drive shaft.

This type of gear has the disadvantage that, when the driven shaft thereof rotates at a speed equal to that of the direct drive, the braking couple which is exerted by the engine upon the vehicle which is then overrunning the engine is relatively small.

It is the principal object of the invention to provide an infinitely variable gear which contains an overunning clutch of the mentioned kind between the driving and driven shafts and which, when employed in a motor vehicle, insures that the braking couple which is exerted by the engine upon the vehicle while the latter is overrunning the engine will be of a considerably greater strength than that exerted by previous gears of this type so that, for example, when the gear is running at a speed corresponding to that of the direct drive, the braking couple of the engine will be approximately of the same size as that which is exerted by the engine when the vehicle is driven, for example, in the second gear.

For attaining this object, the invention provides that one of the outer members of the outer overrunning clutches of the gear which are disposed eccentrically to the drive shaft are positively connected by means of gears to the outer member of the central overrunning clutch which is provided between the driving and driven shaft, and that the outer member of each of the outer clutches has a number of gear teeth greater than the number of gear teeth on the outer member of the central overrunning clutch between the driving and driven shafts.

It is a further object of the invention to insure that when the element which controls the adjustable members of the outer overrunning clutches has been adjusted to its greatest degree of eccentricity, the forces are no longer transmitted from the drive shaft to the driven shaft through the outer overrunning clutches, the axes of rotation of which extend parallel to the axis of the drive shaft. The invention therefore provides that, when the control element has reached its greatest degree of eccentricity relative to the drive shaft, the forces are transmitted from the drive shaft to the driven shaft only by means of the gear wheels of the gear.

In order to attain this further object, the invention provides the outer member of the central overrunning clutch which connects the driving and driven shafts with an extension which has internal gear teeth on its free end and surrounds a sleeve or the like with outer gear teeth which rotates together with the drive shaft but is adjustable in the axial direction relative thereto, while the outer gear teeth of the sleeve are adapted to be engaged with the inner gear teeth of the outer member of the overrunning clutch when the control element is adjusted to its maximum degree of eccentricity relative to the drive shaft. In order to insure that the gear teeth of the outer main member of the central overrunning clutch and of the mentioned sleeve will not be engaged with each other until the control element has been set to its greatest degree of eccentricity relative to the drive shaft, it is advisable to provide the sleeve with at least one, but preferably two apertures and the control element with at least one, but preferably two inclined cams, the maximum distance of which from an axis which extends vertically to the direction of movement of the control element is equal to the maximum eccentricity of the control element relative to the drive shaft. Although the sleeve may be adjusted by a special control device, it is more advisable to provide at least one spring which acts upon the sleeve and tends to move it in the direction toward the eccentrically adjustable control element.

The infinitely variable gear according to the invention permits a motor vehicle or other machine to be started and accelerated very easily at a high starting torque and the required maximum speed in the direct drive to be maintained as long as this is advisable. Dependent upon the dimensions of the geared parts of the overrunning clutches, the invention also permits that, when the forces are transmitted directly through the geared parts, the speed of the driven shaft may be higher than that of the drive shaft.

The above-mentioned objects, features, and advantages of the present invention will be more clearly apparent from the following detailed description thereof which is to be read with reference to the accompanying drawings, in which FIGURE 1 shows a longitudinal section of an infinitely variable gear according to the invention for accomplishing the principal object thereof;

FIGURE 2 shows a modification of a part of the gear according to FIGURE 1 with means for also accomplishing the second object of the invention;

FIGURE 3 shows a cross section taken along line III—III of FIGURE 2; while

FIGURE 4 shows a cross section taken along line IV—IV of FIGURE 2.

Figure 1:
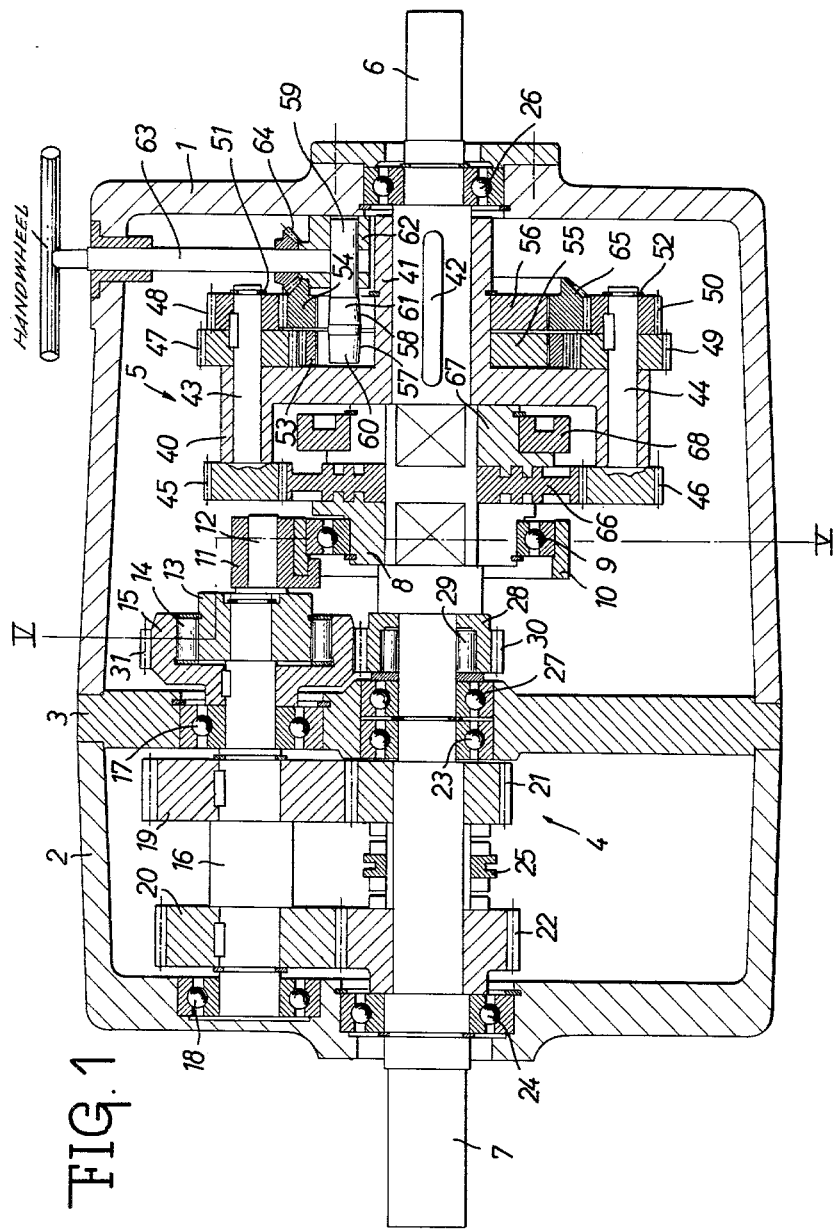
Figure 5:
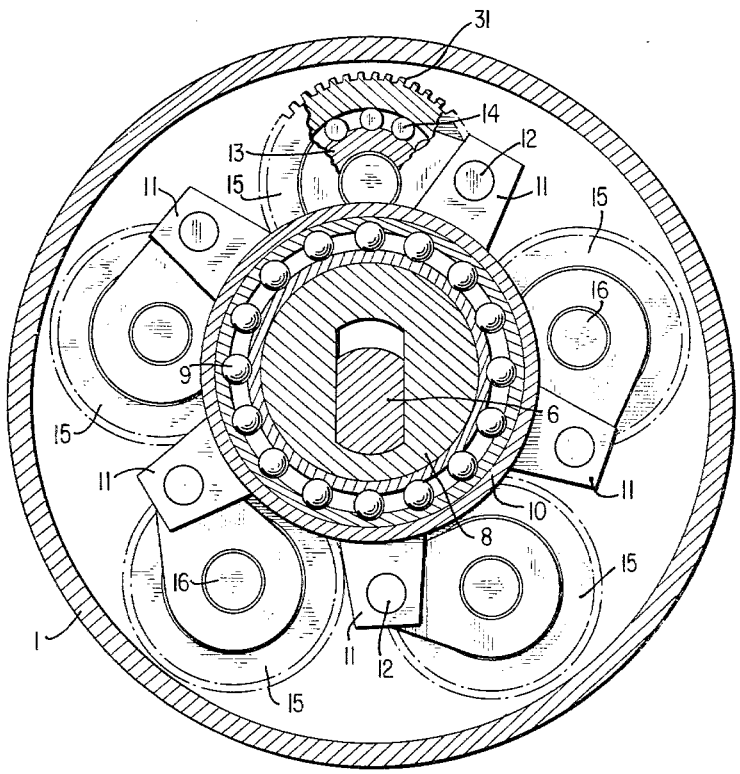
FIGURE 5 shows a transverse view, partly in section, taken along line V—V of FIGURE 1.

In the drawings, FIGURE 1 shows a housing, the different parts 1 and 2 of which are separated from each other by a stationary partition 3 and contain an infinitely variable gear 4 and a control mechanism 5 therefor. The drive shaft of this gear is indicated at 6 and the driven shaft at 7. Insofar as the control mechanism 5 of the gear is concerned which as such does not contain any particular inventive features, it suffices here to say that it permits the adjustment of a disk 8 in a direction vertical, i.e. perpendicular to the common axis of the driving and driven shafts. This disk carries bushings 11 of several outer overrunning clutches, FIGURE 1 showing one of these and FIGURE 5 showing portions of all these clutches, which are mounted on the drive shaft on a ball bearing 9 and a ring 10. Bushing 11 carries a pin 12 which is rotatably mounted therein and is rigidly secured by an arm to the inner main member 13 of an outer overrunning clutch and oscillates this member 13 back and forth when disk 8 is shifted eccentrically from its central position, whereby the outer member 15 of each of the outer overrunning clutches is moved by means of grip rollers 14 of a conventional type when the inner member 13 moves in one of its two directions of oscillation. Member 13 is rotatably mounted on the right end of a shaft 16 on which the outer main member 15 is rigidly secured. Shaft 16 is mounted on ball bearings 17 and 18 in the partition 3 and in the end wall of part 2 of the housing and its carries two spur gears 19 and 20 which mesh with spur gears 21 and 22, respectively, which are freely rotatable on the driven shaft 7 which is likewise mounted on ball bearings 23 and 24 in partition 3 and in the end wall of the housing part 2. Between the two spur gears 21 and 22 a slide member 25 is provided which has claws adapted to be connected to the claws on one or the other of the two spur gears so that either of them may be positively connected to the driven shaft. The left part of drive shaft 6 which is mounted on a ball bearing 27 in the partition 3 forms the inner main member of a central overrunning clutch, the outer main member 28 of which may be connected by means of grip rollers 29 to drive shaft 6. The outer main member 28 is provided with outer gear teeth which mesh with outer gear teeth 31 on the outer main member 15 of one of the outer overrunning clutches.

As long as drive shaft 6 rotates at a speed higher than that of the driven shaft 7, the forces are transmitted through the outer overrunning clutches 13, 14, 15 of which, for example, six may be provided. As soon as the driven shaft 7 starts to rotate at a speed higher than that of the drive shaft 6 the driven shaft will be positively connected through gears 22 and 20 or 21 and 19 to shaft 16 and through the outer main member 15, its gear teeth 31 and gear teeth 30 on the outer main member 28 to the drive shaft 6 so that the engine will then exert a considerably stronger braking couple upon the vehicle which is then overrunning the engine than this has been possible with any of the known gears.

As illustrated very clearly in FIGURES 2 to 4, the further object of the invention as previously described is attained by providing the outer main member 28 of the central overrunning clutch between the drive shaft and the driven shaft with a tubular extension which has internal gear teeth 32 and extends in the direction toward the control element 8. This extension of the outer main member 28 surrounds a sleeve 33 which has outer gear teeth 33' and a pair of recesses 34 and 35 in the end surface facing the control element 8. Sleeve 33 is acted upon by a spring 36 which tends to move the sleeve in the direction toward the control element 8. Sleeve 33 may, however, also be shifted by different means in the direction toward the control element 8 when the gear teeth 33' are to be engaged with gear teeth 32. The control element 8 is provided on its end surface facing sleeve 33 with two inclined cams 37 and 38 which are made of such a length that, as long as cams 37 and 38 engage upon the end surface of sleeve 33 which contain the recesses 34 and 35, the gear teeth 33' on sleeve 33 cannot engage with the gear teeth 32. When the control element 8 is set to a degree of eccentricity of zero, cams 37 and 38 of this element are spaced from recesses 34 and 35 of sleeve 33 for a distance $e$ which is equal to the maximum eccentricity to which the control element 8 may be adjusted relative to drive shaft 6. As illustrated in FIGURE 3, recesses 34 and 35 lie radially of the drive shaft 6 on a diametrical line 39 which extends vertically to the direction of movement of the control element 8, while when the control element 8 has an eccentricity of zero, cams 37 and 38 lie at one side of this diametrical line 39, as shown in FIGURE 4.

If the control element 8 is moved from the position as illustrated in FIGURES 2 and 4 to its most eccentric position relative to the drive shaft 6, cams 37 and 38 will be in a position of alignment with recesses 34 and 35 so that sleeve 33 will then be moved by spring 36 toward the right, as viewed in FIGURE 2, and gear teeth 33' will then engage into the gear teeth 32, while cams 37 and 38 are then located within recesses 34 and 35. The outer main member 28 of the central overrunning clutch which serves for connecting the drive shaft 6 and the driven shaft 7 to each other is then positively connected to drive shaft 6.

If drive shaft 6 is driven at a speed of, for example, 1400 r.p.m and the speed of the driven shaft 7 is changed by a suitable adjustment of the control element 8 from zero to, for example, 1200 r.p.m., and provided that gears 31 and 30 have the proper ratio to each other, it is then possible to increase the prevailing driven speed to such an extent that the peripheral speed of the outer main member 15 will be higher than the angular speed of the inner main member 13. Members 13 of the outer overrunning clutches will thus be inoperative, which means that not only the efficiency of the gear will be improved, but that also the entire control mechanism will be relieved of any load. Therefore the gear will remain in perfect order for a much greater length of time.

If the speed of the driven shaft is to be reduced, the control element 8 is moved by its control mechanism back in the direction toward the drive shaft 6, whereby cams 37 and 38 force the sleeve 33 toward the left against the action of spring 36 whereby the gear teeth 32 and 33' are disengaged from each other. The forces are then again transmitted through the outer overrunning clutches 13, 14, 15.

The control mechanism as illustrated in FIGURE 1 comprises a supporting member 40 of a substantially cup-shaped cross section which has a hub 41 which is mounted on drive shaft 6 and prevented by a spline 42 from rotating relative thereto. The supporting member 40 has at least two shafts 43 and 44 rotatably mounted therein, each of which carries on its left end a pinion 45 or 46, respectively, or may be integral therewith. The other end of each shaft 43 and 44 has pinions 47 and 48 or 49 and 50, respectively, secured thereto which are locked on these shafts by means of spring washers 51 and 52. These pinions mesh with gear rings 53 and 54, each of which surrounds an expansible ring 55 or 56 which has a central aperture of a size in accordance with the outer diameter of hub 41 of the supporting member 40 and in addition an eccentrical aperture 57 or 58, respectively, which has a conical surface. Into these two apertures 57 and 58, the conical surfaces of which are tapered in opposite directions, similarly tapered cones 60 and 61 engage which are secured to the left end of a control member 59. This control member 59 is guided in a stationary bushing 62 which also serves for guiding a rod 63 or the like on which a pinion 64 is secured. When rod 63 is shifted in its axial direction, pinion 64 may be engaged with gear teeth 65 on the gear ring 54, whereby the members of the control mechanism 5 may be turned even when the drive shaft 6 is not rotating.

Pinions 45 and 46 are in mesh with the outer gear teeth on a disk 66 which is freely rotatable on drive shaft 6 and is provided at opposite sides with left and right-hand threads into which corresponding threaded parts engage which project from the disk-shaped control element 8 and from a second disk 67. The control element 8 carries the mentioned ball bearing 9 and a ring 10 thereon, while disk 67 carries a ring 68 which serves as a counterweight.

When the control member 59 is being adjusted in its axial direction by suitable means, not shown, disk 66 is turned in one or the other direction about drive shaft 6 whereby disks 8 and 67 are adjusted in a direction at right angles to the axis of the drive shaft. While the drive shaft 6 is rotating, the driven shaft 7 may therefore be stopped or driven at any desired speed.

Althougth my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. An infinitely variable gearing, preferably for motor vehicles, comprising a manually controlled drive shaft, a control element rotatable therewith, a driven shaft, a plurality of outer overrunning clutches each comprising a plurality of members, said control element being adjustable in directions perpendicular to said drive shaft to different eccentric positions relative to said drive shaft, one of said members of each of said plurality of outer overrunning clutches having an axis of rotation extending parallel to said drive shaft, gearing connecting another of said members to said driven shaft, a central overrunning clutch interposed between said drive and driven shafts for coupling said shafts when said driven shaft rotates at a speed higher than the speed of said drive shaft, said last-named overrunning clutch comprising a member rigidly connectable to said drive shaft when the speed of said driven shafts exceeds the speed of said drive shaft, gearing operatively connecting said another of said members of each of said outer overrunning clutches and said member rigidly connectable to said drive shaft, said last-named gearing comprising gear teeth on said another of said members and gear teeth on said member rigidly connectable to said drive shaft, said first-named gear teeth being greater in number than said second-named gear teeth, said member rigidly connectable to said drive shaft being the outer member of said central overrunning clutch and being provided with a tubular extension having internal gear teeth in its free end, a sleeve member rotatable with but axially slidable on said drive shaft and contained within said outer member, said sleeve member being provided with external teeth engageable with said internal gear teeth when said control element is adjusted to the position of maximum eccentricity relative to said drive shaft.

2. An infinitely variable gearing as defined in claim 1, further including means for insuring that said external gear teeth on said sleeve member will not engage with said internal gear teeth of said outer member except when said control element is in said position, said means including at least one inclined cam member on said control element abutting and restraining said sleeve member from endwise movement in all of said eccentric positions of said control element except said position of maximum eccentricity, means facilitating the engagement of said external teeth comprising at least one recess in said sleeve member, said cam member being in registry with said recess upon the adjustment of said control element to said position of maximum eccentricity.

3. An infinitely variable gearing as defined in claim 2, wherein said means facilitating the engagement of said external and internal teeth further comprise at least one spring for shifting said sleeve member axially when said cam member is in said registry with said recess.

References Cited by the Examiner

UNITED STATES PATENTS

| 1,349,328 | 8/1911 | De Martino | 74—117 |
| 2,672,062 | 3/1954 | De Marchi | 74—117 X |

DON A. WAITE, *Primary Examiner.*